United States Patent
Knapp

Patent Number: 6,019,818
Date of Patent: *Feb. 1, 2000

[54] COMBINATION QUENCHING AND SCRUBBING PROCESS AND APPARATUS THEREFOR

[75] Inventor: Gerhard F. Knapp, San Clemente, Calif.

[73] Assignee: G.F.K. Consulting, Ltd., San Clemente, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/722,507

[22] Filed: Sep. 27, 1996

[51] Int. Cl.[7] .................................................. B01D 47/14
[52] U.S. Cl. ............................ 95/187; 95/211; 96/272; 96/273; 96/290; 261/98; 261/112.1
[58] Field of Search ................................... 261/98, 112.1, 261/DIG. 54, 17; 55/223; 95/187, 211; 96/272, 273, 290

[56] References Cited

U.S. PATENT DOCUMENTS

| | | | |
|---|---|---|---|
| 3,009,687 | 11/1961 | Hendriks | 261/DIG. 54 |
| 3,367,402 | 2/1968 | Cross, Jr. et al. | 261/DIG. 54 |
| 3,404,512 | 10/1968 | Tomany | 95/211 |
| 3,544,086 | 12/1970 | Willett | 261/DIG. 54 |
| 3,601,374 | 8/1971 | Wheeler | 261/DIG. 54 |
| 3,841,061 | 10/1974 | Pike | 55/223 |
| 3,898,308 | 8/1975 | Baum | 261/69 |
| 3,925,039 | 12/1975 | Ziegler | 55/223 |
| 3,944,401 | 3/1976 | Dorr et al. | 95/211 |
| 3,959,420 | 5/1976 | Geddes et al. | 261/112 |
| 3,998,612 | 12/1976 | Lundy | 55/220 |
| 4,050,912 | 9/1977 | Hemsath | 55/223 |
| 4,087,602 | 5/1978 | Kolm | 261/63 |
| 4,110,088 | 8/1978 | Cold et al. | 55/90 |
| 4,127,621 | 11/1978 | Berst et al. | 261/118 |
| 4,172,708 | 10/1979 | Wu et al. | 48/62 R |
| 4,192,659 | 3/1980 | Kiang | 55/89 |
| 4,249,920 | 2/1981 | Vesel | 55/233 |
| 4,269,609 | 5/1981 | Brunold et al. | 55/71 |
| 4,269,812 | 5/1981 | Edwards et al. | 423/242 |
| 4,294,663 | 10/1981 | Tennyson | 201/39 |
| 4,352,718 | 10/1982 | Grün | 159/48 |
| 4,411,846 | 10/1983 | Ulrich et al. | 261/98 |
| 4,425,285 | 1/1984 | Shimoi et al. | 261/95 |
| 4,460,552 | 7/1984 | Zakrzewski | 261/98 |
| 4,511,519 | 4/1985 | Hsia | 261/94 |
| 4,512,784 | 4/1985 | De Loach | 55/196 |
| 4,576,763 | 3/1986 | Nutter | 261/94 |
| 4,600,844 | 7/1986 | Atkins | 307/118 |
| 4,642,127 | 2/1987 | Ando et al. | 55/20 |
| 4,652,407 | 3/1987 | Lambertz et al. | 55/241 |
| 4,722,745 | 2/1988 | Pike | 55/233 |
| 4,793,831 | 12/1988 | Dirks et al. | 55/20 |
| 4,981,500 | 1/1991 | Krause et al. | 55/226 |
| 5,064,450 | 11/1991 | Lankton | 55/70 |
| 5,087,432 | 2/1992 | Hansen | 423/240 R |
| 5,122,309 | 6/1992 | Moerer | 261/95 |
| 5,131,260 | 7/1992 | Brand et al. | 73/23.2 |
| 5,318,758 | 6/1994 | Fujii et al. | 423/228 |
| 5,364,604 | 11/1994 | Spink et al. | 261/94 |
| 5,376,165 | 12/1994 | Ruff et al. | 95/212 |
| 5,387,277 | 2/1995 | Brasier | 95/159 |
| 5,405,590 | 4/1995 | Macedo et al. | 423/210 |
| 5,453,115 | 9/1995 | Vuletic | 95/186 |
| 5,512,085 | 4/1996 | Schwab | 95/200 |

*Primary Examiner*—Richard L. Chiesa
*Attorney, Agent, or Firm*—Crowe & Dunlevy, P.C.; Bill D. McCarthy; Phillip L. Free, Jr.

[57] ABSTRACT

Quenching and scrubbing are accomplished simultaneously in a single downflow apparatus which functions both as an adiabatic quencher and a packed bed scrubber. A special feature of the quencher/scrubber is a hot-cool interface which is effective in controlling corrosion.

2 Claims, 3 Drawing Sheets

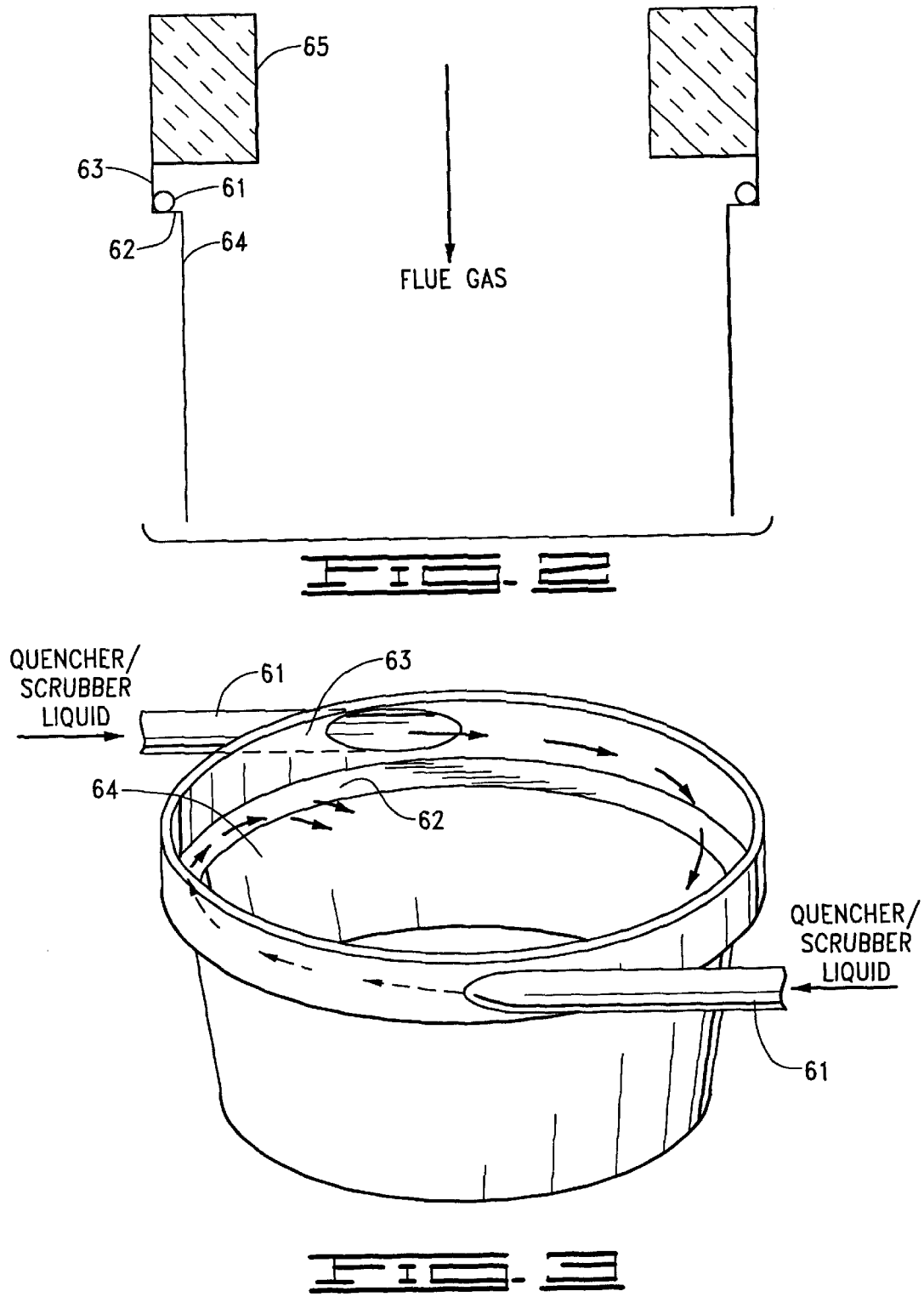

COMBINATION QUENCHING AND SCRUBBING PROCESS AND APPARATUS THEREFOR

FIELD OF THE INVENTION

The present invention relates to cleanup of process gas streams and more particularly to a process for cooling and removing contaminants from gases. In one of its more particular aspects, this invention relates to apparatus for simultaneously quenching and scrubbing a hot gas stream which is contaminated with acidic and particulate impurities.

BACKGROUND OF THE INVENTION

Wet scrubbing gas contaminants of hot gases first requires quenching to reduce gas temperature which is generally accomplished as a separate step prior to introduction of the gas into scrubbing apparatus. "Quenching" means bringing hot gases into thermal equilibrium with fresh water or a quench liquid. Quenching cools hot gases from temperatures above about 750° F., for example, temperatures of 1400°–3000° F., to temperatures of 90°–200° F. The exact quenched gas temperature depends mainly upon the temperature and water content of the hot gas. The quench, or quencher, is the apparatus into which hot/dry gas generated in an incinerator, for example, enters, where the gas is cooled through evaporation of water from quench liquid, and from which the gas exits in a state of thermal equilibrium with the quench liquid. The quench requires special metallurgy and careful attention to mechanical construction in all areas in contact with, or in potential contact with, hot/dry gas and with quench liquid. Quench areas that are always in contact with quench liquid can be fabricated from fiberglass reinforced plastics (FRP) or other polymeric materials. The quench must be designed and operated for maximum reliability in order to protect temperature-sensitive downstream equipment such as equipment fabricated of fiberglass reinforced plastics (FRP) or other polymeric materials. In an incineration process, for example, an incineration process in which acidic gaseous contaminants are formed, the quench experiences some of the most severe corrosion problems of the whole incineration system. The hot acidic flue gases resulting from incineration can be contained with appropriate refractory-lined carbon steel, so long as the steel is maintained at a temperature above the acid dew point. The quenched acidic gas and the quench liquid are noncorrosive to a number of FRP and other nonmetallic materials. The quenched acidic gas is also relatively noncorrosive to several special alloys.

The quench region especially subject to attack by high temperatures and also by corrosive quencher liquid is the hot-cool interface (HCI). The HCI is located at the hot gas inlet of the quencher. The HCI comprises the first zone of a quencher/scrubber or of a traditional quencher, which ends at a point where all structural parts are 100% covered with quench liquid, and thus protected from the thermal effects of the hot gas.

When properly designed, quenches operate very reliably. Direct quenching of 1500° F. or hotter acidic flue gases resulting from incineration of organic materials has the additional advantage of eliminating de novo dioxin/furan formation associated with high temperatures and slow cooling of hot acidic flue gases that occur in heat recovery boilers commonly used in connection with incinerators. Since the water content of flue gas is increased during quenching, it is essential to provide a system that supplies sufficient water or quench liquid and sufficient contact between the hot flue gas and the water or quench liquid, so that the cooled flue gas is in thermal equilibrium with the quench water or quench liquid.

Following quenching, the usual procedure involves wet scrubbing of the quenched gas in a separate scrubber to remove gaseous and particulate contaminants from the quenched gas. Scrubbing systems prevent contaminants from attaining levels which may be injurious to plant and animal life and the environment. Scrubbing by the use of wet scrubbers creates large liquid-to-gas areas so that gaseous contaminants may be absorbed. The scrubbing liquid can be water, a basic solution for removing acidic gaseous contaminants, such as HCl or $SO_2$, or an acidic solution which can be used to remove basic contaminants, such as $NH_3$. Many types of scrubbers are available. These include venturi scrubbers, cyclonic scrubbers, spray-type cyclonic scrubbers, packed towers, and others. Many scrubbers remove particulates as well as gaseous impurities.

Although the use of a separate quencher and a separate scrubber has proved satisfactory in the past, there are certain disadvantages connected with the use of multiple pieces of equipment to first quench and then remove contaminants from flue gas and other gaseous streams commonly encountered in industrial operations. One of the disadvantages is the cost of providing and maintaining a separate piece of industrial equipment for quenching and another separate piece for removing gaseous and particulate contaminants from such gaseous streams. Another disadvantage is the necessity to control the operation of the quencher to effect optimum reduction in temperature of the gas being treated and to control the operation of the scrubber to ensure maximum removal of the gaseous and other contaminants from the gas stream.

It is therefore a principal object of the present invention to provide a system whereby flue gases and other process gas streams containing contaminants can be quenched and scrubbed simultaneously.

Another object of this invention is to provide unitary equipment for conducting quenching and scrubbing operations.

Another object of this invention is to reduce the cost of pollution control where the polluting gas stream is at an elevated temperature.

A further object of the present invention is to reduce the complexity of equipment required for quenching and scrubbing.

Yet a further object of the present invention is to improve environmental cleanup by providing an effective means for removing contaminating gases and particulates from flue gases and other hot gaseous process streams to environmentally acceptable levels.

Yet a further object is to provide an improved hot-cool interface (HCI).

Other objects and advantages of this invention will become apparent from the following detailed disclosure and description.

SUMMARY OF THE INVENTION

Quenching and scrubbing can be readily accomplished simultaneously in a single downflow apparatus which functions both as an adiabatic quencher and a packed bed scrubber. The quencher/scrubber attaches immediately downstream of the equipment which produces the contaminant-containing gaseous stream, for example, a thermal or catalytic combustor which burns halogenated or other acid-producing waste.

The process has the following advantages: The gases are cooled and the contaminants removed simultaneously. In addition, the process may be conducted in a single column, eliminating the need for a separate gas scrubber column. The process also can be conducted in a column which need not be as tall as a conventional spray quencher column. If desired, a polishing scrubber may be used to further purify the gaseous products.

Further process improvements are realized by utilizing an improved hot-cool interface (HCI). The improved HCI minimizes the corrosion and high temperature stresses associated with the transition zone of conventional HCIs. The improvements are achieved through the tangential injecting of quench liquid onto a circular shelf. By proper selection of the shelf width, quench liquid injection velocity and flow rate, the quench liquid is uniformly distributed around the circular shelf. The quench liquid cascades over the lip of the circular shelf and irrigates the walls of the quencher uniformly and reliably. The quencher walls thus receive optimum protection from the effects of the hot gases. The improved HCI can be used equally well with a quencher or with a quencher/scrubber.

BRIEF DESCRIPTION OF THE DRAWINGS

The advantages and features of the present invention will be better understood by further considering the following description in conjunction with the accompanying drawings in which:

FIG. 2 is a diagrammatic cross-section of an improved hot-cool interface (HCI) which can be used with the combination quencher/scrubber of the present invention;

FIG. 3 is a diagrammatic isometric view of the HCI of the present invention;

DETAILED DESCRIPTION

Figure 1:
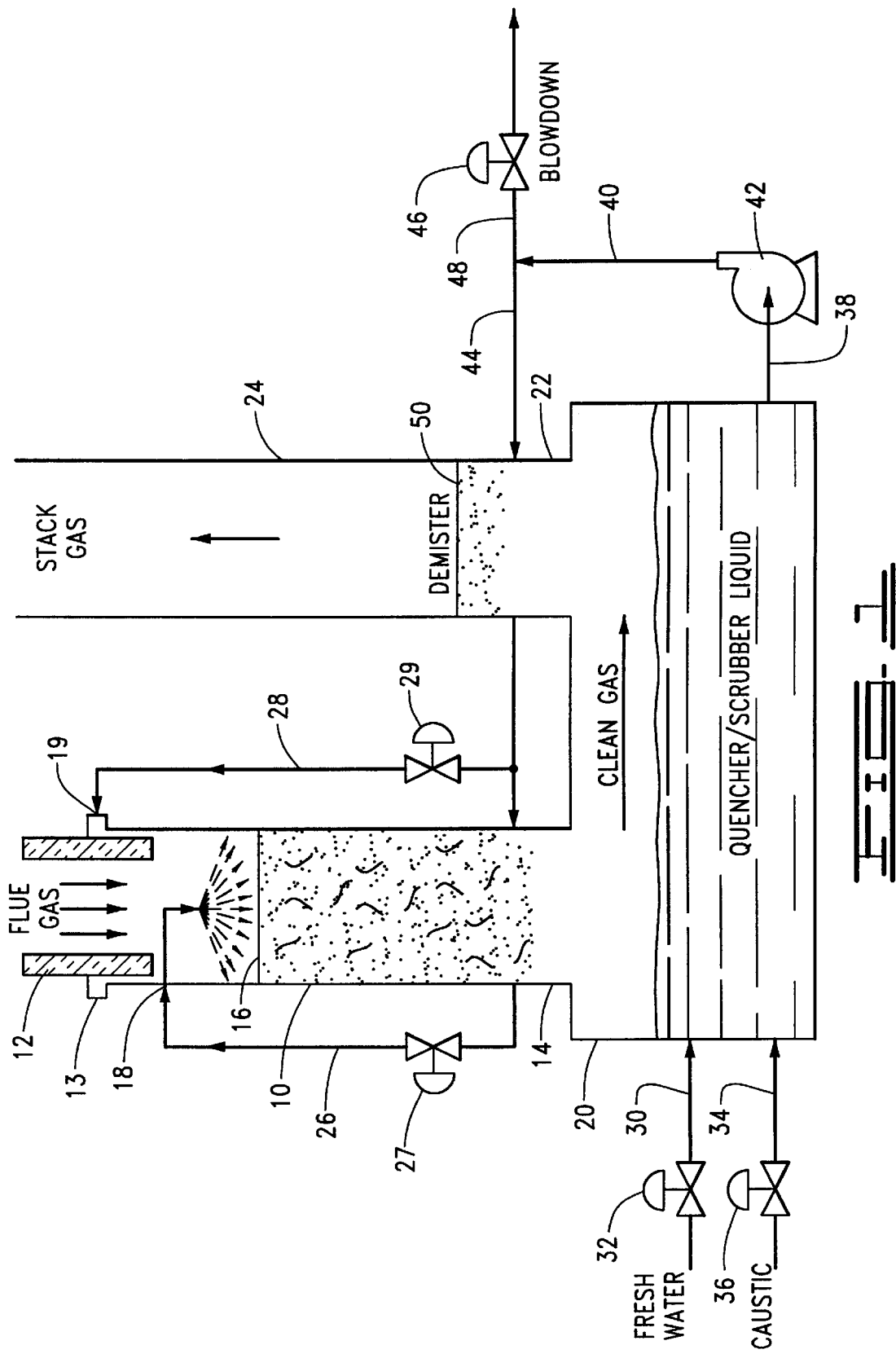
FIG. 1 is a schematic diagram of the general arrangement of a quencher/scrubber according to the present invention.

Simultaneous quenching and scrubbing of hot gases from incinerators, thermal oxidizers, catalytic oxidizers, or other types of high temperature process equipment are accomplished by contacting a packed column wetted with a liquid which is distributed over the packing through one or more appropriately located spray nozzles with a hot gas contaminated with acid gases or particulates which must be removed prior to discharge of the gas to the atmosphere. Contact of the hot gases with the wetted packing results in cooling by evaporation of water from the liquid which is used to wet the packing. At the same time, acid gases, such as hydrogen chloride (HCl) and sulfur dioxide ($SO_2$) are absorbed by the liquid.

In quenching the hot gases introduced into the combination quencher/scrubber of the present invention, or in quenching the hot gases introduced into a conventional quencher, it is essential that all non-refractory lined surfaces exposed to the hot flue gas be protected against thermal or corrosive attack by being completely bathed in water, quench liquid, or a mixture of water and quench liquid. In practice, it is impossible to instantaneously change from the hot/dry conditions, where refractory lined steel provides satisfactory thermal and corrosion protection to the cool/wet conditions, where special metals and various non-metals provide satisfactory thermal and corrosion protection, without a transition zone. The hot-cool interface (HCI) is defined as the apparatus, or the part of a larger apparatus, used to accomplish the changeover from hot/dry to cool/wet conditions to which the materials of construction are exposed. The transition zone is defined as that region within the HCI where the materials of construction are alternately exposed to hot/dry conditions and to cool/wet conditions. Hot incinerator gases having temperatures in the range of about 750° to 3000° F. can be contained by refractory backed with carbon steel. Gases which have been cooled to less than about 200° F. can be contained by plastic materials such as FRP, vinyl ester resins, Teflon, Kynar, and similar polymeric materials. For a typical HCI, the exposure of the materials of construction to a region of hot and dry gas on the one hand, and the exposure of the materials to an immediately adjacent region of cool quench liquid, on the other hand, produces thermal and corrosion stresses that few, if any, materials can stand for long periods of time. Even more damaging is the inevitable movement of the dividing line between the two regions and the associated alternate exposure of the materials of construction to hot/dry and cool/wet conditions. One of two situations is likely to occur in a conventional HCI. In the first situation, the cool/wet region is designed so it is covered with quench liquid 100% of the time, with the inevitable result that quench liquid will from time-to-time contact the hot/dry region, which is normally built from refractory, and which is very sensitive to shock caused by contact with the quench liquid. In the second situation, the refractory remains 100% hot and dry, with the inevitable result that part of the normally cool/wet region is exposed from time-to-time to hot flue gas. Even high nickel alloys often used in the cool/wet region, such as the Hastelloy™ alloys, are subject to failure under these conditions.

The most common method of controlling the HCI is to deluge the materials of construction with sprays of water or quench liquid. Uniform coverage, however, is difficult to achieve. Sprays are especially prone to cause a large and poorly defined transition zone. Sprays are also more prone to cause the very damaging movement of the transition zone. The use of overflow weirs is another way to provide irrigation of the materials of construction of the inside walls of the quenching apparatus. Perfectly horizontal weirs are required in order to have uniform 360° overflow. Such perfection is nearly impossible to obtain because it requires true construction of the weir in the manufacturing shop; perfectly horizontal installation of the weir; and absolute avoidance of shifting, tilting, or warping of the weir during heat-up and operation. Without having the weir horizontal, uniform 360° coverage is difficult to achieve. Rather, coverage will either be missing on parts of the wall or could be so restricted that all of the liquid spills over a short length of the weir circumference similar to a waterfall. In either case, parts of the wall will be dry and exposed to high temperature gas while the rest of the wall will be wet and cool.

In order to overcome this problem, the quencher/scrubber of the present invention, or a conventional scrubber, can be equipped with an improved HCI which utilizes tangential liquid injection onto a horizontal liquid distribution shelf to overcome the above-discussed defects. Through proper selection of the width of the distribution shelf, the flow rate of the tangentially injected liquid and the velocity of the tangentially injected liquid, uniform coverage of the quencher walls can easily be achieved even if the HCI is not in a truly horizontal position, or even if the distribution shelf has minor surface imperfections. In order to further improve operation, the liquid injection system for the HCI can be built so as to reduce the temperature of the gases around the transition zone to such a point that they do not create thermal or corrosion stresses associated with conventional HCIs. The proper placement of the HCI liquid injection point in effect eliminates the problems that occur with the adjoining hot/dry and cool/wet areas of conventional HCIs used in many commercially available quenchers. In addition, recirculating quencher/scrubber liquid can be used for wall irrigation, which obviates the need for fresh water.

Referring now to the drawings, FIG. 1 shows a general arrangement of the quencher/scrubber of the present invention in which a column 10 is provided with an entry 12 and an exit 14. Within column 10 is situated a packed bed 16. Between entry 12 and column 10 is situated an HCI 13. Column 10 is also provided with an entry for quencher/scrubber liquid 18 and an entry for wall irrigation liquid 19. A sump 20 is situated below column 10. Sump 20 is provided with an entry connected to exit 14 of column 10 and an exit 22 connected with an exhaust manifold 24. Quencher/scrubber liquid is provided to column 10 above packed bed 16 by means of a conduit 26 and a valve 27. Wall irrigation liquid is supplied to HCI 13 via a conduit 28 and a valve 29. Fresh water is provided to sump 20 by means of a conduit 30 and a valve 32. Caustic is provided to sump 20 by means of a conduit 34 and a valve 36. Quencher/scrubber liquid is removed from sump 20 via a conduit 38 and a conduit 40 by means of a pump 42. Quencher/scrubber liquid and HCI liquid are provided to column 10 and HCI 13 via a conduit 44. The remainder of the quencher/scrubber liquid is discharged as blowdown by means of a conduit 48 and a control valve 46.

The flue gas entering column 10 through entry 12 is simultaneously quenched and cleaned by packed bed 16. The cooled and cleaned gas leaving column 10 via exit 14 is passed through an appropriate device, such as a demister 50, to remove the droplets of quencher/scrubber liquid that are usually entrained in the clean gas as a result of the liquid cleaning process.

FIG. 2 shows a hot-cool interface (HCI) where the transition zone is optimally controlled and minimized. A nozzle 61, used to introduce wall irrigation liquid, projects tangentially onto a horizontal shelf 62 from which rises a vertical section 63, which can be placed immediately under a refractory lined hot gas exit 65. Extending down from shelf 62 is the quencher/scrubber wall 64. Thus, the invention minimizes the destructive effects caused by alternating between exposing the materials of construction, in the absence of a protective film of liquid, to hot gases, and then wetting the hot materials with quencher/scrubber liquid, or with fresh water, or with a combination of the two. The transition zone is well defined, very narrow, and stable. It receives additional protection from extreme temperatures because of its location away from the direct influence of the hot gas stream. The invention is equally suitable for use with a conventional quencher.

FIG. 3 shows the improved HCI isometrically. Combined quencher/scrubber liquid, fresh water, or a combination of the two, is injected tangentially through one or more nozzles 61 onto a circular, horizontal shelf 62. Inertia causes some of the liquid to rise against a vertical section 63 after exiting nozzle 61 as it circulates around the shelf. By proper selection of (a) the width of shelf 62, (b) the diameter of nozzle 61, and (c) the liquid injection rate, the liquid is distributed onto the shelf in such a manner as to provide for the uniform irrigation of the quencher/scrubber wall 64 with a continuous film of liquid formed by spilling over the edge of shelf 62. All areas of the quencher wall 64 are continuously and completely covered with a flowing film of liquid and are protected from the high temperatures of the adjacent hot gases. Two injection nozzles are shown for convenience, although it should be appreciated that any convenient number of nozzles can be used.

Figure 4:
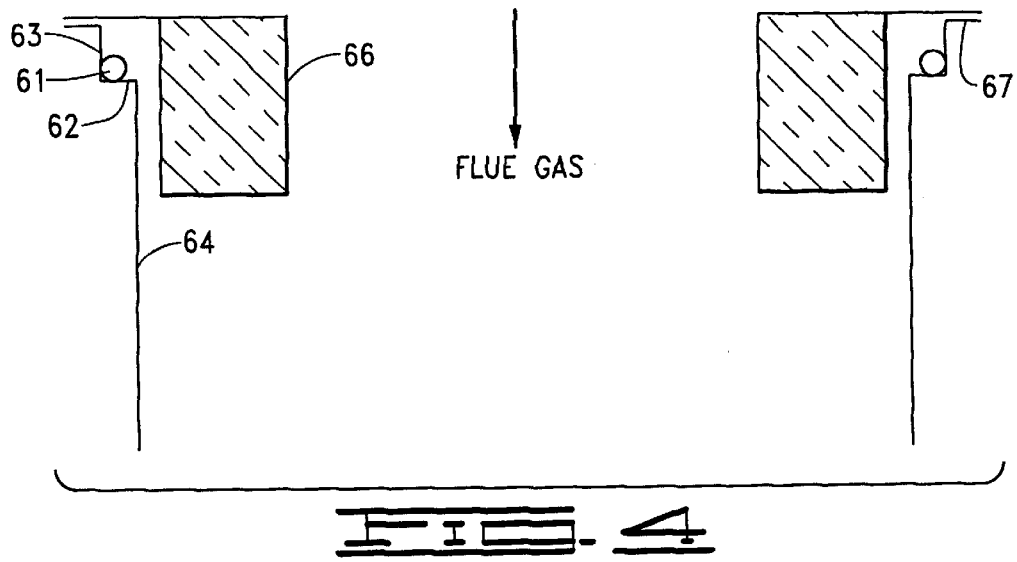
FIG. 4 is a diagrammatic cross-sectional view of another embodiment of the HCI of the present invention.

FIG. 4 illustrates the principle of temperature control around the transition zone of the HCI. A refractory-lined extension 66 of the hot gas inlet duct extends into the combined quencher/scrubber, or into a conventional quencher, below the point of liquid injection onto shelf 62. The extension is designed to restrict the access of hot gases to the transition zone of the HCI by limiting the space between the outer metal wall of extension 66 and the quencher wall 64. The extension 66, shown as a separate device, is attached to the HCI by means of a flange 67. The outer metal wall of extension 66 is normally designed to operate at around 350° F. maximum. It is obvious from FIG. 4 that the outside edges of flange 67, which are exposed to ambient air, will be even cooler due to heat loss to the surroundings. The temperature at the transition zone of the HCI, and specifically at the vertical section 63, is therefore very cool compared to the 3000° F. temperature that can prevail around the transition zone of a typical HCI.

Figure 5:
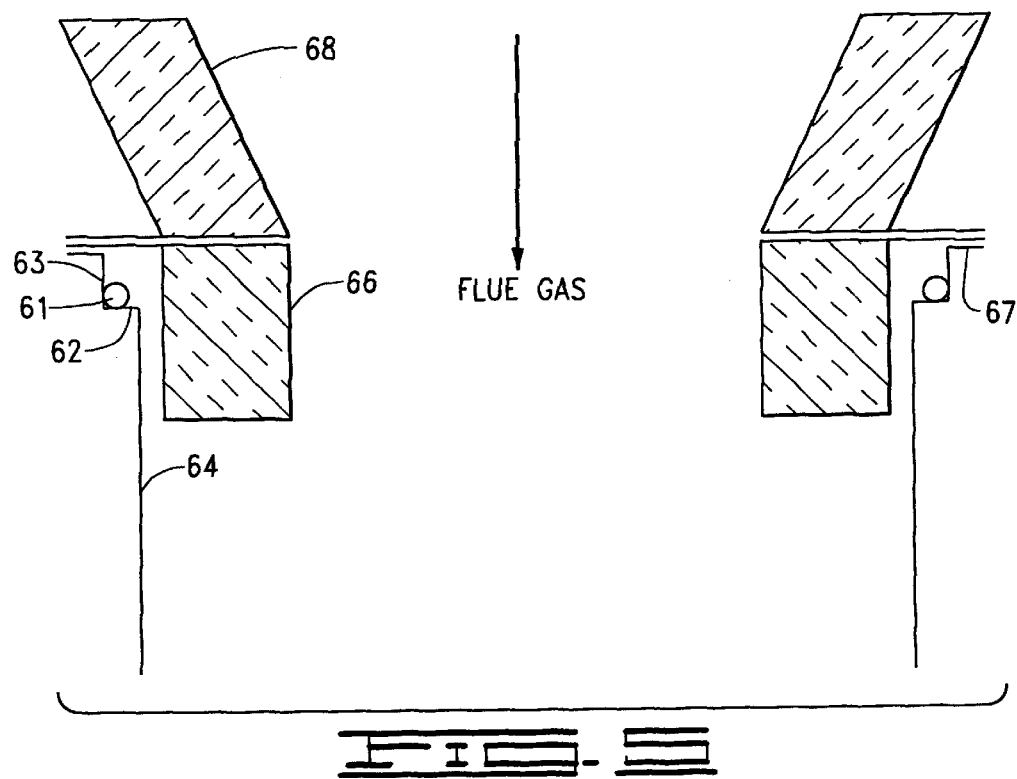
FIG. 5 is a diagrammatic cross-sectional view of a third embodiment of an HCI of the present invention.

FIG. 5 shows the connection of the hot gas duct to the quencher/scrubber and the extension 66 depicted in FIG. 4. The hot gas duct 68 normally has a refractory lining and a steel shell. The hot gas duct and the extension 66 are connected to the HCI by means of a flange 67. The extension 66 can also be a permanent part of the HCI, or a permanent part of the hot gas duct, rather than a separate device, as shown in the drawings.

The foregoing detailed description is to be clearly understood as given by way of illustration and example only, the spirit and scope of this invention being limited solely by the appended claims.

What is claimed is:

1. A process for simultaneously quenching and scrubbing a hot gas stream, which comprises:

passing a liquid downwardly through a packed bed to provide a continuously wetted, packed bed;

passing a gas stream containing gaseous and particulate contaminants and having a temperature of about 750° F. to 3000° F. concurrently with said liquid through said continuously wetted, packed bed, without any quenching occurring prior to passing said gas stream through said continuously wetted, packed bed, to simultaneously quench and scrub said gas stream;

recovering a gas substantially free of gaseous and particulate contaminants and having a temperature of about 90° F. to 200° F. from the bottom of said continuously wetted, packed bed;

recycling liquid which has been passed through said packed bed; and disposing the packed bed within a column having an inside wall wherein a hot-cool interface is formed on the inside wall of the column by:

tangentially injecting a liquid onto a circular, horizontal shelf formed between an upper portion of the column wall and a lower portion of the column wall, said lower portion having a lesser diameter than said upper portion; and overflowing a steady stream of the tangentially injected liquid from said shelf upon the lower portion of the column wall to uniformly wet the inside of said lower portion of the column wall.

2. A single column quencher/scrubber apparatus, which comprises:
- a column;
- means at the top of said column for introducing a hot gas stream;
- a packed bed immediately below the hot gas stream introducing means;
- means for introducing a liquid into said packed bed concurrently with the hot gas stream;
- means below said packed bed for recovering quenched and scrubbed gas and liquid from said packed bed;
- means for recycling liquid to said packed bed;
- a circular, horizontal shelf formed in the wall of said column above the point of introduction of said hot gas stream, said shelf extending inwardly from the wall of said column; and
- means for tangentially injecting a liquid onto said shelf;
    - said means for recovering quenched and scrubbed gas and liquid being adapted to also recover the tangentially injected liquid;
    - said means for recycling liquid being adapted to also recycle the tangentially injected liquid.

* * * * *